(12) United States Patent
Lv

(10) Patent No.: US 11,950,978 B2
(45) Date of Patent: Apr. 9, 2024

(54) ORTHODONTIC SELF-LIGATING BRACKET SYSTEM WITH OPEN AUXILIARY GROOVE, AND SELF-LIGATING BRACKET THEREOF

(71) Applicant: Tao Lv, Jinan (CN)

(72) Inventor: Tao Lv, Jinan (CN)

( * ) Notice: Subject to any disclaimer, the term of this patent is extended or adjusted under 35 U.S.C. 154(b) by 0 days.

(21) Appl. No.: 18/280,004

(22) PCT Filed: Jul. 30, 2021

(86) PCT No.: PCT/CN2021/109901
§ 371 (c)(1),
(2) Date: Sep. 1, 2023

(87) PCT Pub. No.: WO2023/272865
PCT Pub. Date: Jan. 5, 2023

(65) Prior Publication Data
US 2024/0041566 A1 Feb. 8, 2024

(30) Foreign Application Priority Data

Jul. 1, 2021 (CN) .......................... 202110749660.X

(51) Int. Cl.
*A61C 7/14* (2006.01)
(52) U.S. Cl.
CPC .................................. *A61C 7/143* (2013.01)
(58) Field of Classification Search
CPC .. A61C 7/143; A61C 7/14; A61C 7/28; A61C 7/12; A61C 7/00; A61C 7/30; A61C 7/34; A61C 7/282

USPC .............................................................. 433/8
See application file for complete search history.

(56) References Cited

FOREIGN PATENT DOCUMENTS

| CN | 204293276 U | 4/2015 |
| CN | 211750181 U | 10/2020 |
| CN | 215192439 U | 12/2021 |

OTHER PUBLICATIONS

Lv, Tao; Orthodontic Self-locking Bracket With Open Auxiliary Groove, with Machine translation (Year: 2020).*
Dec. 28, 2021 Office Action issued in Chinese Patent Application No. 202110749660.X.
Mar. 22, 2022 Search Report issued in International Patent Application No. PCT/CN2021/109901.

* cited by examiner

*Primary Examiner* — Ralph A Lewis
*Assistant Examiner* — Mirayda A Aponte
(74) *Attorney, Agent, or Firm* — Oliff PLC

(57) ABSTRACT

An orthodontic self-ligating bracket system with an open auxiliary groove, and a self-ligating bracket. The system includes brackets, wherein each bracket includes a main groove and auxiliary groove, and an elastic baffle plate is between the main and auxiliary grooves; the brackets include first, second and third brackets. The first bracket is arranged on an incisor, the second bracket is arranged on a canine, the third bracket is arranged on a premolar, and the elastic baffle plates of the first bracket, the second bracket and the third bracket are ingeniously arranged, such that an arch wire of the bracket system generates different orthodontic forces at the positions corresponding to different brackets.

7 Claims, 4 Drawing Sheets

ORTHODONTIC SELF-LIGATING BRACKET SYSTEM WITH OPEN AUXILIARY GROOVE, AND SELF-LIGATING BRACKET THEREOF

TECHNICAL FIELD

The present invention relates to the field of tooth orthodontics equipment, and in particular, to an orthodontic self-ligating bracket system with an open auxiliary groove, and a self-ligating bracket thereof.

BACKGROUND

Selective extraction of a tooth is often required in orthodontic treatment to provide space for decongestion in a dental arch or adduction of a protruding incisor. For most cases that should be treated by extraction, a premolar is usually extracted. With the least impact on a shape and a function of the dental arch, the extraction of the premolar is of great significance for correction of malocclusion.

After the premolar is extracted, labial sides of remaining teeth are bonded to orthodontic brackets. The plurality of orthodontic brackets are connected by arch wires as a track for tooth movement, and are matched with various booster accessories to generate an orthodontic force to move the teeth to ideal positions and angles. This achieves a goal of aligning teeth, improving aesthetics and functions. However, when the orthodontic brackets are matched with the arch wires to move the teeth, it is difficult to achieve precise, safe, and efficient control of tooth movement.

During incisor adduction, there is a large clearance between the existing incisor bracket groove and the arch wire, which can only be controlled by applying a torque couple on the arch wire. However, currently, a torque moment of couple is difficult to achieve precise control. The clearance cannot be eliminated if the torque is reduced, and stress concentration in an apical area of an incisor is often prone to side effects of root resorption or even shortening when the torque is increased. In this case, orthodontic treatment efficacy and long-term stability are affected.

In a stage of aligning and leveling, a canine is often inclined before treatment, and is prone to inclination after being subjected to the orthodontic force of the teeth movement. In this case, an arch wire extends to elongate the incisor, and a plurality of potential hazards are caused due to an overbite of the anterior teeth. In addition, the teeth may move back and forth, affecting the curative effect and course of the whole orthodontic treatment.

When closing an extraction gap, the arch wire is usually bent into a rocking chair shape to counteract a "roller coaster effect" generated by closing the gap, so that roots of the teeth on both sides of the gap can move in parallel to close the gap. However, when the rocking chair arch wire is located in the groove of the orthodontic bracket, an excessive friction force may be generated between a rocking chair deformed part of the arch wire and the corresponding groove of the orthodontic bracket. To overcome the friction force, it is necessary to increase the orthodontic force. However, excessive orthodontic force may cause displacement of other teeth that do not move in addition to periodontal destruction.

At present, the problems objectively exist in the field of dental orthodontics. In order to resolve the problems, doctors can only adjust a bonding position of an orthodontic bracket, a degree of bending adjustment of an arch wire, and a magnitude of an orthodontic force based on personal experience. It is difficult to achieve precise, safe, and efficient control of tooth movement, which increases a risk, and time and economic costs of a patient.

SUMMARY

The present invention provides an orthodontic self-ligating bracket system with an open auxiliary groove, and a self-ligating bracket thereof. The orthodontic self-ligating bracket system has a reasonable structural design. A first bracket is disposed on an incisor. A second bracket is disposed on a canine. A third bracket is disposed on a premolar. Elastic baffle plates of the first bracket, the second bracket and the third bracket are ingeniously arranged, so that an arch wire of the bracket system generates different orthodontic forces at positions corresponding to different brackets. Torque applying on the incisor does need to be very precise. The elastic baffle plate of the first bracket can ensure slow release of stress and avoid a side effect of excessive stress absorption in an apical area of the tooth. The second bracket provides a movable clearance close to one side of the incisor for the arch wire, and it is not prone to overbite of the incisor due to a change of a tooth axis of the canine. Notches on both sides of the third bracket can provide a movable clearance for the arch wire. When a rocking chair arch wire is added, a friction force between the rocking chair arch wire and the third bracket can be reduced, movement of irrelevant teeth caused due to large orthodontic force is avoided, and problems existing in the conventional technology are resolved.

To resolve the technical problems, the present invention adopts the following technical solution: An orthodontic self-ligating bracket system with an open auxiliary groove includes a plurality of brackets. The bracket is provided with an inner main groove and an auxiliary groove, an elastic baffle plate is arranged between the main groove and the auxiliary groove, and the bracket includes a first bracket, a second bracket and a third bracket.

Two ends of an elastic baffle plate of the first bracket are flush with two side walls of the first bracket.

One end of an elastic baffle plate of the second bracket is flush with a side wall of the second bracket, and the other end of the elastic baffle plate of the second bracket and a side wall of the second bracket form a single-side notch.

Two ends of an elastic baffle plate of the third bracket are symmetrically provided with double-sided notches.

The first bracket is disposed on an incisor, the second bracket is disposed on a canine, the third bracket is disposed on a premolar, and the first bracket, the second bracket and the third bracket are matched with each other, so that an arch wire of the bracket system generates different orthodontic forces at positions corresponding to different teeth.

Further, the second bracket is disposed on the canine, and the single-side notch of the second bracket is disposed toward the incisor for allowing the arch wire to move. This reduces a friction force generated between one side of the second bracket close to the incisor and the arch wire, and avoids side effects of incisor elongation, overbite, and the like.

Further, there are two premolars on a same side. After one premolar is extracted, the third bracket is disposed on the other premolar that is not extracted, and the double-sided notch of the third bracket is used for reducing a friction force generated between the arch wire and the third bracket.

Further, the elastic baffle plate of the first bracket is provided with a middle notch.

Further, in a length direction of the elastic baffle plate, a size of the middle notch of the first bracket is more than or equal to 10% of a full size of the elastic baffle plate, and less than or equal to 60% of a full size of the elastic baffle plate.

Further, in a length direction of the elastic baffle plate, a size of the single-side notch of the second bracket is less than or equal to 60% of a full size of the elastic baffle plate.

Further, in a length direction of the elastic baffle plate, a size of the double-sided notch of any third bracket is less than or equal to 30% of a full size of the elastic baffle plate.

Further, a buccal tube is further included. The buccal tube is disposed on a molar, and forms the orthodontic self-ligating bracket system with the first bracket, the second bracket, and the third bracket.

It should be noted that elastic baffle plates of the first bracket, the second bracket and the third bracket have different forms, and shapes of the other structures are the same.

A self-ligating bracket used for the orthodontic self-ligating bracket system, including:

a bracket body, where a base is arranged on a bottom of the bracket body, and the base abuts against a tooth;

a main groove, where the main groove is provided in the bracket body for disposing a thick arch wire;

an auxiliary groove, where the auxiliary groove is disposed at one side of the main groove for disposing a thin arch wire, and a direction of the auxiliary groove is same as a direction of the main groove; and an elastic baffle plate, where the elastic baffle plate is disposed between the main groove and the auxiliary groove to isolate the main groove from the auxiliary groove, and the elastic baffle plate respectively abuts against the thick arch wire or the thin arch wire. An elastic baffle plate is additionally disposed on a bracket structure, so that a plurality of self-ligating brackets can be linked to adapt to different needs of different teeth on arch wire orthodontic force through an elastic force change of the elastic baffle plate.

The present invention has the beneficial effects of the structure. The first bracket is disposed on an incisor and a molar. The second bracket is disposed on a canine. The third bracket is disposed on a premolar. The elastic baffle plates of the first bracket, the second bracket and the third bracket are ingeniously arranged, so that an arch wire of the bracket system generates different orthodontic forces at positions corresponding to different brackets. Torque applying on the incisor does need to be very precise. The elastic baffle plate of the first bracket can ensure slow release of stress and avoid a side effect of excessive stress absorption in an apical area of the tooth. The second bracket provides a movable clearance close to one side of the incisor for the arch wire, and it is not prone to overbite of the incisor due to a change of a tooth axis of the canine. Notches on both sides of the third bracket can provide a movable clearance for the arch wire, so that the premolar is not prone to anchorage loss due to mesial inclination. When a rocking chair arch wire is added, a friction force between the rocking chair arch wire and the third bracket can be reduced, movement of irrelevant teeth caused due to large orthodontic force is avoided.

Figure 1:
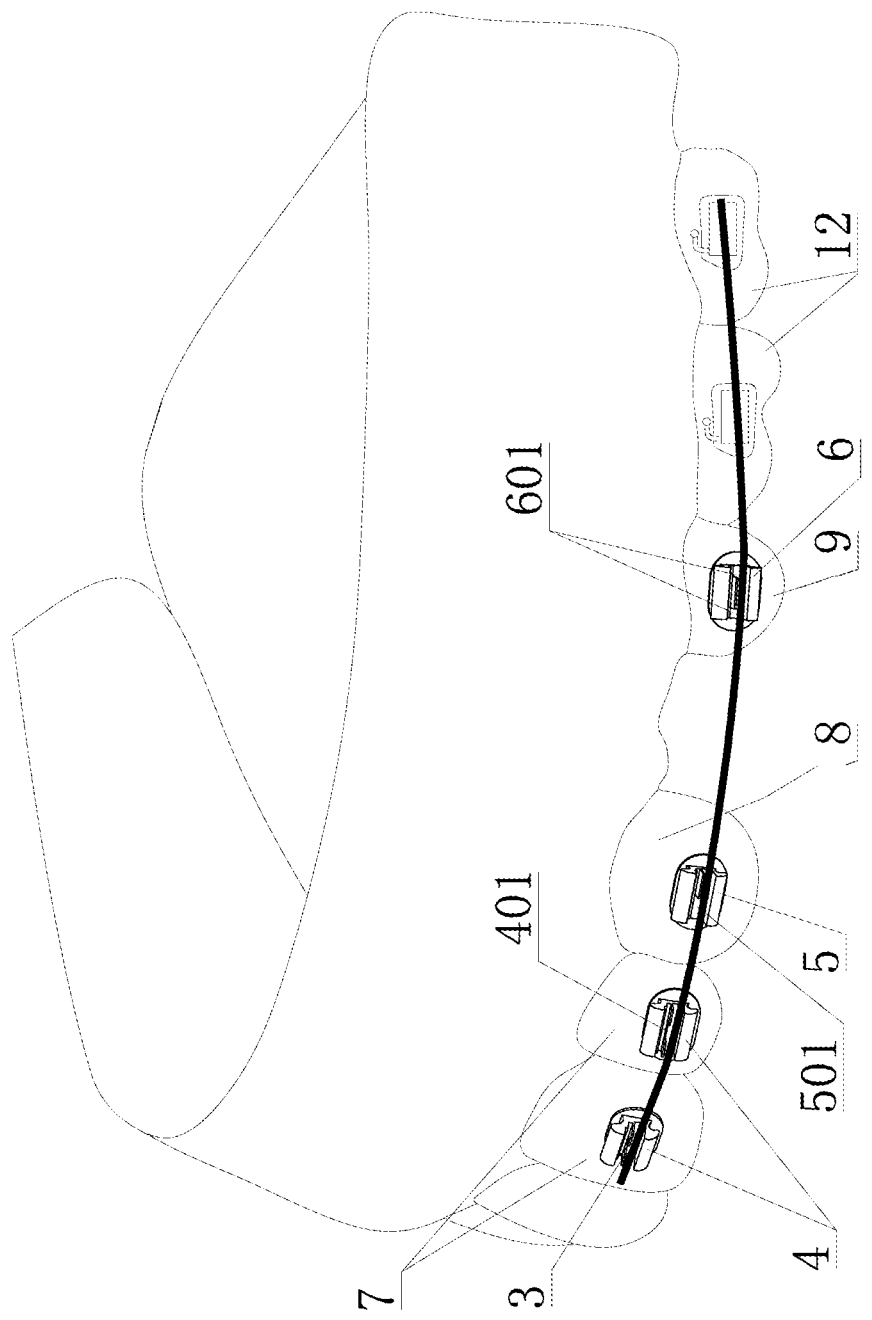
FIG. 1 is a schematic diagram of an overall structure of the present invention.
Figure 2:
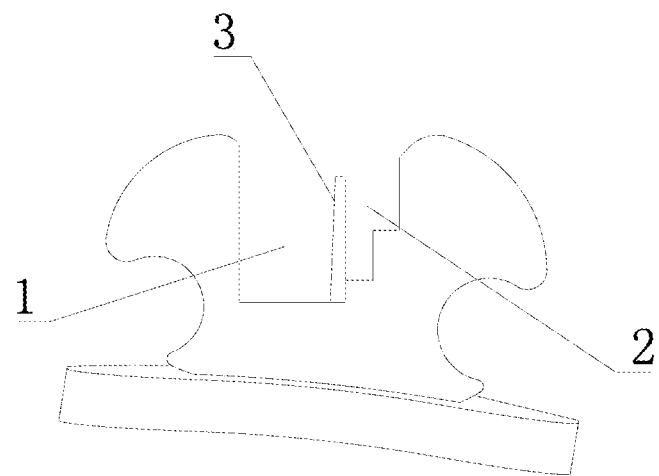
FIG. 2 is a schematic diagram of a side-view structure of the present invention.
Figure 3:
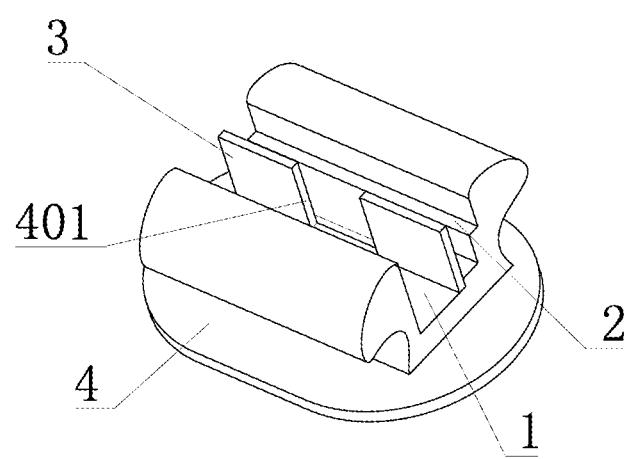
FIG. 3 is a schematic diagram of a three-dimensional structure of a first bracket of the present invention.
Figure 4:
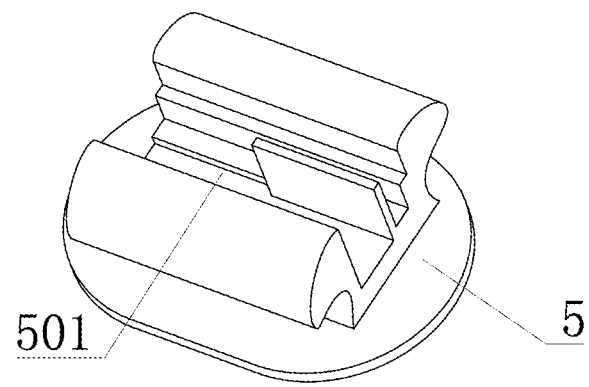
FIG. 4 is a schematic diagram of a three-dimensional structure of a second bracket of the present invention.
Figure 5:
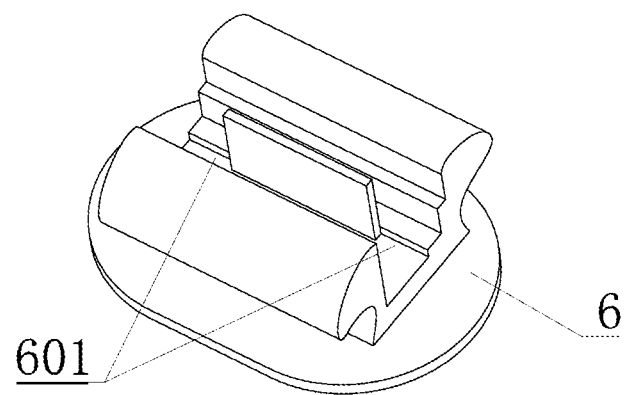
FIG. 5 is a schematic diagram of a three-dimensional structure of a third bracket of the present invention.

1, main groove; 2, auxiliary groove; 3, elastic baffle plate; 4, first bracket; 401, middle notch; 5, second bracket; 501, single-side notch; 6, third bracket; 601, double-sided notch; 7, incisor; 8, canine; 9, premolar; 10, arch wire; 11, buccal tube; 12, molar; 13, bracket body; 1301, base; 14, thick arch wire; and 15, thin arch wire.

DETAILED DESCRIPTION OF EMBODIMENTS

In order to clearly illustrate the technical features of the solution, the present invention will be described in detail below through specific embodiments and in conjunction with the accompanying drawings.

In the following description, many specific details are set forth in order to fully understand the present application. However, the present application can also be implemented in other ways than described herein. Therefore, the protection scope of the present application is not limited by the following specific embodiments disclosed.

As shown in FIG. 1 to FIG. 5, an orthodontic self-ligating bracket system with an open auxiliary groove includes a plurality of brackets. The bracket is provided with an inner main groove 1 and an auxiliary groove 2, and an elastic baffle plate 3 is arranged between the main groove 1 and the auxiliary groove 2. The bracket includes a first bracket 4, a second bracket 5 and a third bracket 6. Two ends of an elastic baffle plate of the first bracket 4 are flush with two side walls of the first bracket 4. One end of an elastic baffle plate of the second bracket 5 is flush with a side wall of the second bracket 5, and the other end of the elastic baffle plate of the second bracket and a side wall of the second bracket 5 form a single-side notch 501. Two ends of an elastic baffle plate of the third bracket 6 are symmetrically provided with double-sided notches 601; and the first bracket 4 is disposed on an incisor 7, the second bracket 5 is disposed on a canine 8, the third bracket 6 is disposed on a premolar 9, and the first bracket 4, the second bracket 5 and the third bracket 6 are matched with each other, so that an arch wire 10 generates different correction forces at positions corresponding to different teeth. According to the solution, the first bracket 4 is disposed on an incisor 7. The second bracket 5 is disposed on a canine 8. The third bracket 6 is disposed on a premolar 9. The elastic baffle plates of the first bracket 4, the second bracket 5 and the third bracket 6 are ingeniously arranged, so that an arch wire 10 of the bracket system generates different orthodontic forces at positions corresponding to different brackets. Torque applying on the incisor 7 does need to be very precise. The elastic baffle plate 3 of the first bracket 4 can ensure slow release of stress and avoid a side effect of excessive stress absorption in an apical area of the tooth. The second bracket 5 provides a movable clearance close to one side of the incisor 7 for the arch wire 10, and it is not prone to overbite of the incisor due to a change of a tooth axis of the canine 8. Double-sided notches 601 on both sides of the third bracket 6 can provide a movable clearance for the arch wire 10, so that the premolar 9 is not prone to anchorage loss due to mesial inclination. When a rocking chair arch wire is added, a friction force between the rocking chair arch wire and the third bracket 6 can be reduced, movement of irrelevant teeth caused due to a large orthodontic force is avoided.

It should be noted that although the orthodontic self-ligating bracket system in this solution is applied to a maxillary tooth as shown in the drawings, a person skilled in the art can know that the system is also suitable for a mandibular tooth. When the orthodontic self-ligating bracket system in this solution is applied to a lower jaw, a first bracket may be disposed for a mandibular incisor or as the mandibular incisor is smaller than a maxillary incisor, or an existing bracket structure without an elastic baffle plate may be used based on different orthodontic needs of the mandibular tooth.

In a preferred embodiment, the second bracket 5 is disposed on the canine 8, and the single-side notch 501 of the second bracket is disposed toward the incisor 7 for allowing the arch wire 10 to move. This reduces a tensile force generated between one side of the second bracket 5 close to the incisor 7 and the arch wire 10. Due to a structural change of the second bracket 5, a movable clearance is provided for one side of the arch wire 10 toward the incisor 7. This reduces an extra tensile force of the arch wire on the incisor 7, and can timely eliminate the downward ineffective tensile force of the arch wire 10 on the incisor 7, so that the incisor 7 is prevented from being outward elongated, and an overbite of the incisor 7 is avoided.

In a preferred embodiment, there are two premolars 9 on a same side of a tooth. After one premolar 9 is extracted, the third bracket 6 is disposed on the other premolar 9 that is not extracted, and the double-sided notch of the third bracket 6 is used for reducing a friction force generated between the arch wire 10 and the third bracket 6. In this embodiment, tooth extraction is usually aligning and adduction of anterior teeth based on a gap after the premolar 9 is extracted, therefore, a rocking chair arch wire is additionally disposed in a groove of an orthodontic bracket. The rocking chair arch wire is a special arch wire added in a gap closing stage of a tooth in the tooth orthodontic field. The curved rocking chair arch wire may pull and move teeth on the two sides of a gap between teeth. The double-sided notches 601 are disposed at the two sides of the elastic baffle plate of the third bracket 6 to provide a movable clearance for the rocking chair arch wire. This effectively reduces an ineffective friction force generated between a curved position of the rocking chair arch wire and the third bracket 6, reduces the orthodontic force generated on the whole arch wire, and avoids movement of irrelevant teeth.

In a preferred embodiment, the elastic baffle plate 3 of the first bracket 4 is provided with a middle notch 401. The middle notch 401 is provided in the middle position of the elastic baffle plate 3 of the first bracket 4, so that the elastic baffle plate 3 of the first bracket 4 is not continuously disposed. While ensuring enough interaction force on the arch wire, the first bracket 4 further can prevent the root of the incisor 7 from excessive stress during torque and force applying.

In a preferred embodiment, in a length direction of the elastic baffle plate 3, a size of the middle notch 401 of the first bracket 4 is more than or equal to 10% of a full size of the elastic baffle plate 3, and less than or equal to 60% of a full size of the elastic baffle plate 3. The size of the middle notch 401 is limited and controlled within a proper size range to balance an action force generated between the elastic baffle plate 3 of the first bracket 4 and the arch wire.

In a preferred embodiment, a maximum size of the single-side notch 501 is limited due to loss of the orthodontic force of the arch wire, to prevent the size of the single-side notch 501 of the second bracket 5 from being excessively large. In a length direction of the elastic baffle plate, a size of the single-side notch 501 of the second bracket 5 is less than or equal to 60% of a full size of the elastic baffle plate 3.

In a preferred embodiment, a maximum size of the doubled-sided notch 601 is limited due to loss of the orthodontic force of the arch wire 10, to prevent the size of the doubled-sided notch 601 of the third bracket 6 from being excessively large. In a length direction of the elastic baffle plate 3, a size of the double-sided notch 601 of any third bracket 6 is less than or equal to 30% of a full size of the elastic baffle plate 3.

In a preferred embodiment, a minimum size of the single-side notch 501 is limited as an insufficient movable clearance of the arch wire 10 leads to failure of friction reduction, to prevent the size of the single-side notch 501 of the second bracket 5 from being excessively small. In a length direction of the elastic baffle plate 3, a size of the single-side notch 501 of the second bracket 5 is more than 10% of a full size of the elastic baffle plate 3.

In a preferred embodiment, a minimum size of the double-sided notch 601 is limited as an insufficient movable clearance of the arch wire 10 leads to failure of friction reduction, to prevent the size of the double-sided notch 601 of the third bracket 6 from being excessively small. In a length direction of the elastic baffle plate 3, a size of the double-sided notch 601 of any third bracket 6 is more than 5% of a full size of the elastic baffle plate 3.

The orthodontic self-ligating bracket system further includes a buccal tube 11. The buccal tube 11 is disposed on a molar 12, and forms the orthodontic self-ligating bracket system with the first bracket 4, the second bracket 5, and the third bracket 6.

It should be noted that elastic baffle plates of first bracket 4, the second bracket and the third bracket 6 have different forms, and shapes of the other structures are the same. According to the whole orthodontic self-ligating bracket system, structural designs of different elastic baffle plates of the three brackets are matched with each other, and act each other to provide an ingenious change for the whole system, so that different orthodontic forces are provided for different teeth.

Figure 6:
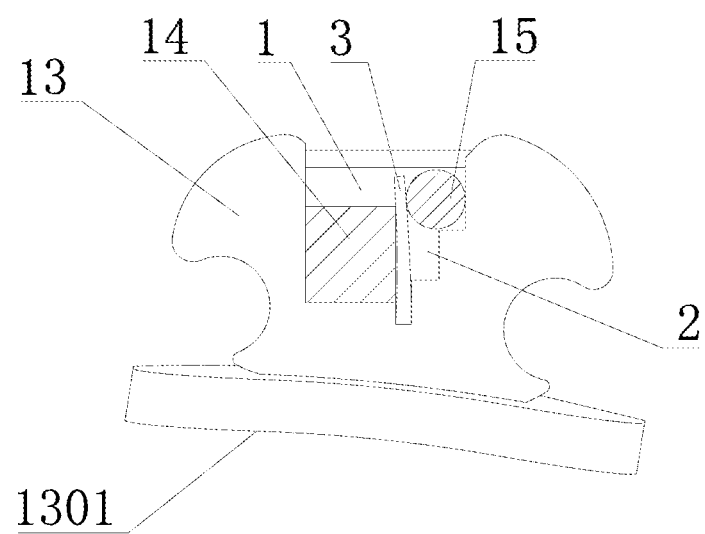
FIG. 6 is a schematic diagram of a structure of a self-ligating bracket of the present invention.

As shown in FIG. 6, a self-ligating bracket used for the orthodontic self-ligating bracket system includes a bracket body 13, a main groove 1, an auxiliary groove 2, and an elastic baffle plate 3. A base 1301 is arranged on a bottom of the bracket body 13, and the base 1301 abuts against a tooth. The main groove 1 is provided in the bracket body 13 for disposing a thick arch wire 14. The auxiliary groove 2 is disposed at one side of the main groove 1 for disposing a thin arch wire 15, and a direction of the auxiliary groove 2 is same as a direction of the main groove 1. The elastic baffle plate 3 is disposed between the main groove 1 and the auxiliary groove 2 to isolate the main groove 1 from the auxiliary groove 2, and the elastic baffle plate 3 respectively abuts against the thick arch wire 14 or the thin arch wire 15. The elastic baffle plate 3 is additionally disposed on a bracket structure, so that a plurality of self-ligating brackets of the orthodontic self-ligating bracket system can be linked to adapt to different needs of different teeth on arch wire orthodontic force through an elastic force change of the elastic baffle plate 3. The specific embodiments are not intended to limit the protection scope of the present invention. For a person skilled in the art, any alternative improvements or transformations made to the embodiments of the present invention fall within the protection scope of the present invention.

The parts that are not described in detail in the present invention are the well-known technologies of a person skilled in the art.

The invention claimed is:

1. An orthodontic self-ligating bracket system, comprising a plurality of brackets and an arch wire;
   wherein the plurality of brackets are provided with an inner main groove and an auxiliary groove;
   wherein the plurality of brackets comprises a first bracket, a second bracket and a third bracket;
   wherein the first bracket includes an elastic baffle plate arranged between the main groove and the auxiliary groove of the first bracket;
   wherein the elastic baffle plate of the first bracket includes two ends flush with two side wall of the first bracket and with a middle notch;
   wherein the second bracket includes an elastic baffle plate arranged between the main groove and the auxiliary groove of the second bracket;
   wherein one end of the elastic baffle plate of the second bracket is flush with a side wall of the second bracket, and the other end of the elastic baffle plate of the second bracket and a side wall of the second bracket form a single-side notch;
   wherein the third bracket includes an elastic baffle arranged between the main groove and the auxiliary groove of the third bracket;
   wherein two ends of an elastic baffle plate of the third bracket are symmetrically provided with double-sided notches; and
   the first bracket is disposed on an incisor, the second bracket is disposed on a canine, the third bracket is disposed on a premolar, and the first bracket, the second bracket and the third bracket are connected to each other through the arch wire configured to generate different orthodontic forces on each of the corresponding teeth.

2. The orthodontic self-ligating bracket system according to claim 1, wherein the second bracket is disposed on the canine, and the single-side notch of the second bracket is disposed toward the incisor for allowing the arch wires to move.

3. The orthodontic self-ligating bracket system according to claim 2, wherein there are two premolars on a same side of a jaw, after one premolar is extracted, the third bracket is disposed on the other premolar that is not extracted, and the double-sided notch of the third bracket is used for reducing a friction force generated between a rocking chair arch wire and the third bracket.

4. The orthodontic self-ligating bracket system according to claim 1, wherein there are two premolars on a same side of a jaw, after one premolar is extracted, the third bracket is disposed on the other premolar that is not extracted, and the double-sided notch of the third bracket is used for reducing a friction force generated between a rocking chair arch wire and the third bracket.

5. The orthodontic self-ligating bracket system according to claim 1, wherein in a length direction of the elastic baffle plate along the arch wire, a size of the middle notch of the first bracket is more than or equal to 10% of a full size of the elastic baffle plate, and less than or equal to 60% of a full size of the elastic baffle plate.

6. The orthodontic self-ligating bracket system according to claim 1, wherein in a length direction of the elastic baffle plate along the arch wire, a size of the single-side notch of the second bracket is less than or equal to 60% of a full size of the elastic baffle plate.

7. The orthodontic self-ligating bracket system according to claim 1, wherein in a length direction of the elastic baffle plate along the arch wire, a size of any of the double-sided notches of the third bracket is less than or equal to 30% of a full size of the elastic baffle plate.

* * * * *